Dec. 11, 1923.
C. G. STRANDLUND
1,476,736
LISTER PLOW
Original Filed June 30, 1920    3 Sheets-Sheet 2
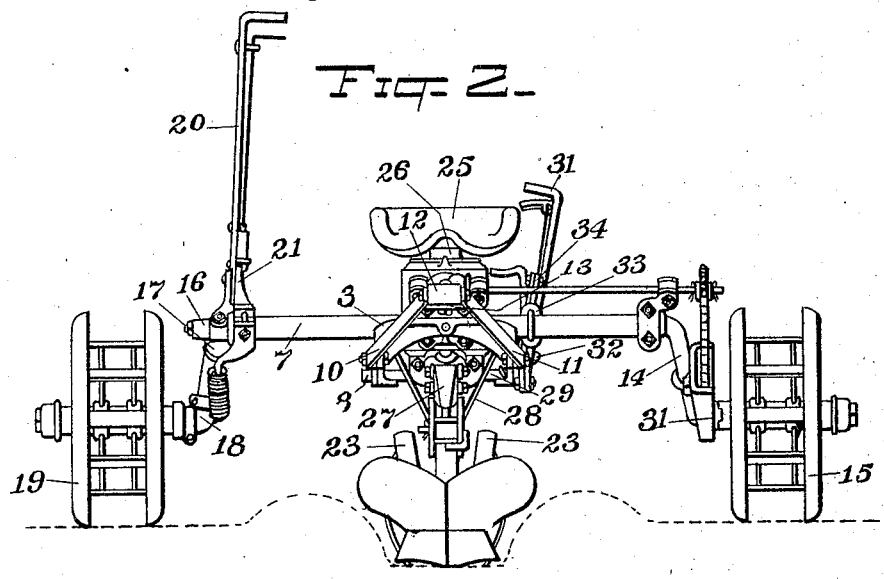
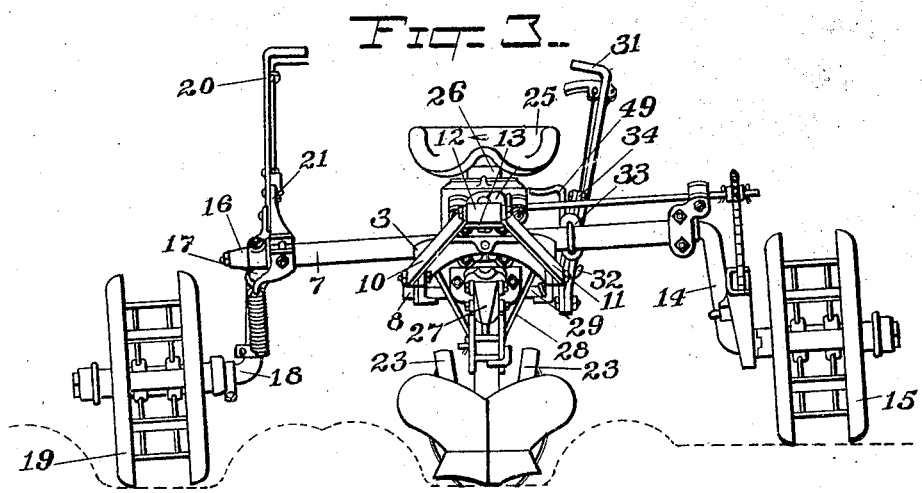
Inventor;
Carl G. Strandlund
by W. C. Johnston
Attorney
Witness;
E. Wilderson Dec. 11, 1923.

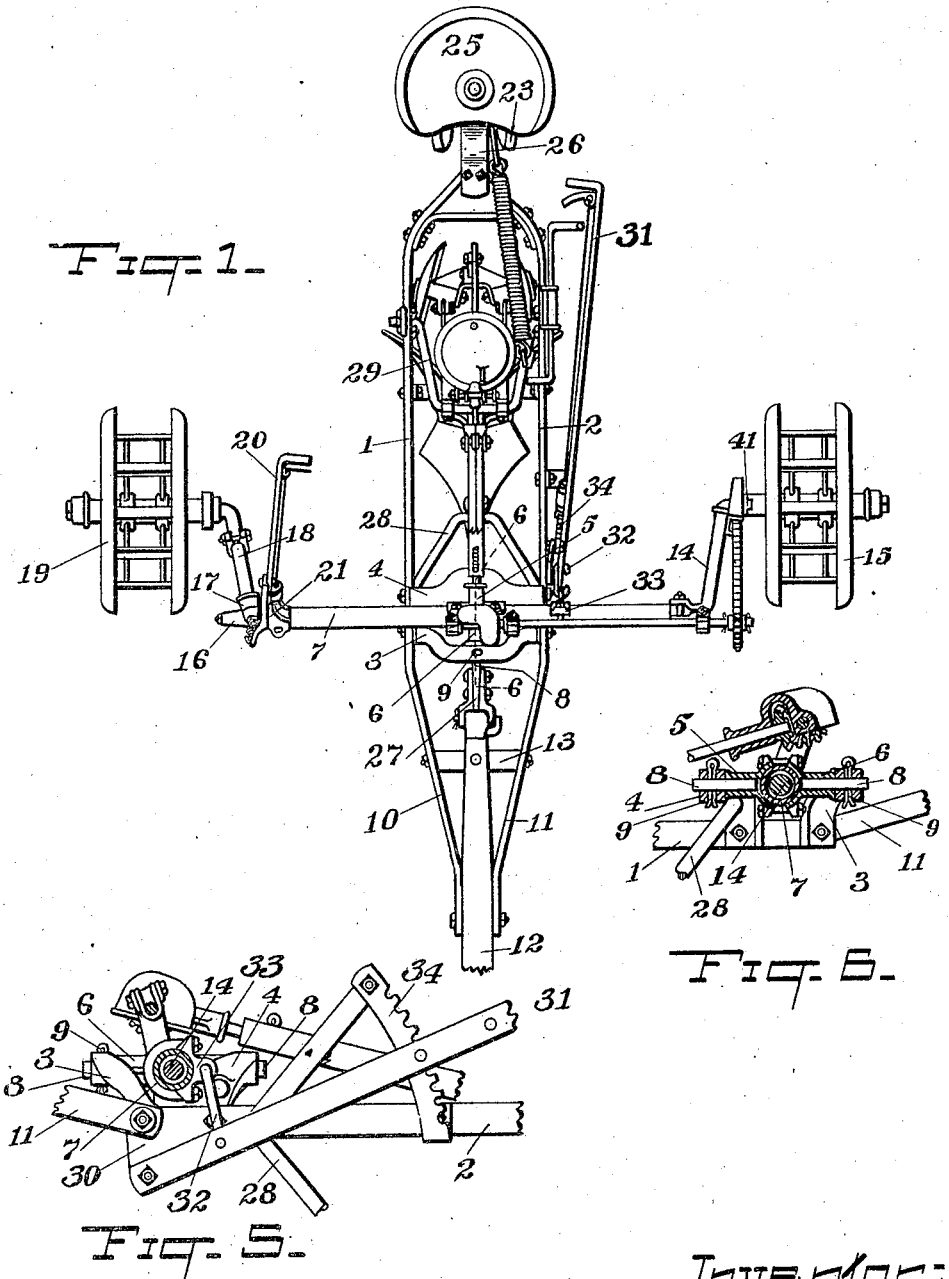

C. G. STRANDLUND

LISTER PLOW 1,476,736

Original Filed June 30, 1920    3 Sheets-Sheet 3

Inventor;
Carl G. Strandlund by W. C. Johnston
Attorney

Witness;
E. Wilderson

Patented Dec. 11, 1923.

1,476,736

UNITED STATES PATENT OFFICE.

CARL G. STRANDLUND, OF MOLINE, ILLINOIS, ASSIGNOR TO DEERE & COMPANY, OF MOLINE, ILLINOIS, A CORPORATION OF ILLINOIS.

LISTER PLOW.

Application filed June 30, 1920, Serial No. 393,055. Renewed April 27, 1923.

*To all whom it may concern:*

Be it known that I, CARL G. STRANDLUND, a citizen of the United States, residing at Moline, in the county of Rock Island and State of Illinois, have invented certain new and useful Improvements in Lister Plows, of which the following is a specification, reference being had therein to the accompanying drawing.

My invention relates to a well known type of lister plows, and has for its object to provide a flexible connection between the plow and its wheeled support whereby the plow can be held independent of the position of the supporting wheels, and at the same time be capable of lateral adjustment.

Referring to the drawings in which similar numerals indicate identical parts—

Figure 1 is a plan view of a lister plow embodying my invention.

Figure 2 is a front elevation showing the plow in operative position and the supporting wheels on level ground.

Figure 3 is a front elevation with one of the supporting wheels in a trench or furrow, and the opposite supporting wheel on unplowed ground, the plow being in operative position and level.

Figure 5 is an enlarged detail of the flexible connection of the plow with its supporting means, and the means for adjusting the plow laterally, and Figure 6 is a detail section on the line 6—6 of Figure 1 as viewed from the right of the machine.

Figure 4:
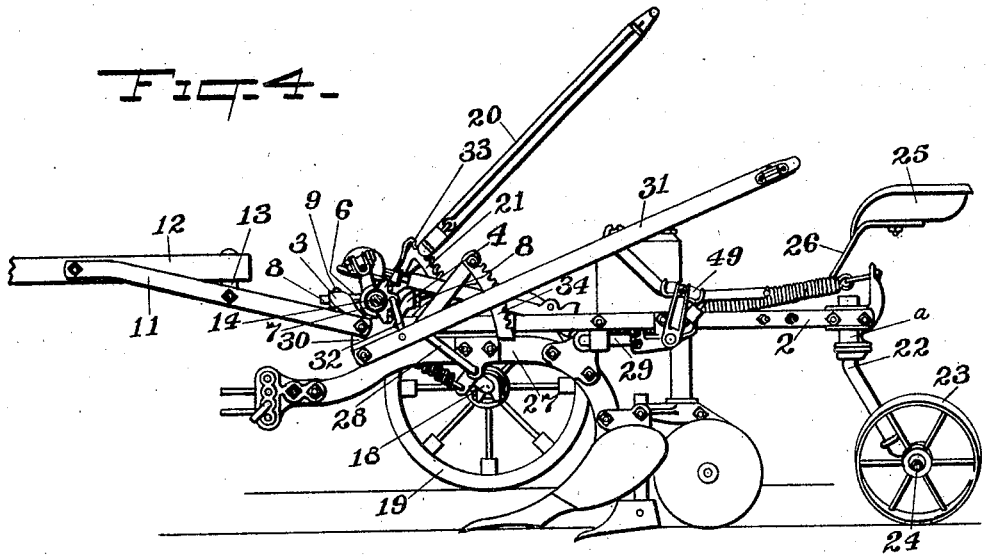
Figure 4 is a side elevation with the rear wheel and part of the axle removed.

An open frame is composed of bars 1 and 2 which converge, at their rear ends to a casting $a$ to which they are rigidly attached, they extend forwardly in parallel relation and are connected rigidly to yoke shaped members 3 and 4, which are spaced apart for the reception of longitudinal bearings 5 and 6 clamped rigidly and centrally to a laterally extending tubular member 7. Pivot pins 8 are secured in openings in the yokes 3 and 4 by cotters 9 and are journaled in the bearings 5 and 6. Pivotally mounted on opposite ends of the yoke shaped member 3 are frame bars 10 and 11 which converge forward to a draft pole 12 to which they are rigidly secured. A cross brace 13 extends between the bars 10 and 11 and is secured thereto and to the pole 12.

The tubular member 7 and the bearings 5 and 6 comprise a wheel frame through the tubular member 7 of which the axle 14 extends; the latter has one end bent downwardly and terminating in a substantially horizontal spindle upon which is mounted a double tread supporting wheel 15. The opposite end of the axle 14 extends from the tubular member 7, and rigidly mounted thereon is a casting 16 having a socket 17 in which is secured the upper end of crank axle 18 having a substantially horizontal spindle on which is mounted a double tread supporting wheel 19. A lever 20 is rigidly attached to the tubular member 7 and is provided with the usual type of latch to engage with a rack 21 on the casting 16 and preferably integral therewith.

The rear of the main frame is supported on a vertical portion of a caster shaft 22 which is journaled in the casting $a$. Wheels 23, converging downwardly, are mounted on an axle 24 secured on the lower end of the caster shaft 22. A seat 25 is mounted on a support 26, on the rear of the frame, convenient to the operating levers.

A plow beam 27 is supported on bails 28 and 29; the bail 28 is pivotally connected to the beam 27 and the yoke shaped member 4, and the bail 29 is pivotally connected to the rear of the beam 27, and to the bars 1 and 2 of the main frame.

Pivoted on a depending bracket 30, on the forward end of the frame bar 2, is a lever 31 having its fulcrum on the lower end of a link 32 pivotally connected to the lever 31, rearward of the pivot of the latter, and pivotally supported in a bracket 33 rigidly secured on the tubular member 7. The lever 31 is provided with the usual type of latch to engage with any one of a series of notches in a rack 34 mounted on the frame bar 2.

Heretofore in listers, whether of the double or single row type, in order to retain the plow level with the ground it has been necessary to swing the supporting wheels, either one or both, forward or backward, due to the fact that the frame carrying the lister parts has been always rigidly connected to the axle of the machine consequently the only adjustment possible in such a construction to level the plow is by the wheel adjustment, the plow being incapable of independent adjustment except vertically, and no provision is made for operating the plow to cure unevenness in the rows of upturned soil. With my invention however, with the plow pivotally supported and capable of being swung laterally on a longitudinal axis, any inequalities in furrows can be readily eliminated, and then again with one of the wheels 15 or 19 in a trench and the other on level ground the wheel frame will be inclined, as shown in Figure 3, but with the ordinary type of lister, as before stated, the wheel on the level ground would have to be swung forward or backward in order to keep the plow level, with my device, by operating the lever 31, the main frame is rocked in the desired direction on the pivots 8 and the level of the plow is readily maintained, notwithstanding the lateral inclination of the wheel frame, or the position of the wheels.

The crank axle 18 and the axle 14, being rigidly connected together by the casting 16, form practically a continuous arched axle, so that by operation of the lever 20 both wheels 15 and 19 are swung simultaneously to raise or lower the plow entirely from the ground or to fix the depth of its operation. Ordinarily however, to raise the plow, I employ a lever 49 pivotally supported on the bar 2 and connected to the plow in any suitable manner to swing the latter and the connected bails.

I have illustrated my invention as applied to a single row lister, but it is equally effective when adapted to two row listers, or to wheeled plows.

I claim:—

1. In a machine of the character described, the combination of a wheel frame, supporting wheels therefor adapted to be moved forwardly or rearwardly to raise or lower the frame, means to move said wheels, a main frame pivotally supported on the wheel frame and rockable laterally, and a plow carried by the main frame and swung laterally by the rocking thereof, and means to raise and lower said plow relatively to the main frame.

2. In a machine of the character described, the combination of a wheel frame, supporting wheels therefor adapted to be moved forwardly or rearwardly to raise or lower the frame, means to move said wheels, a main frame pivotally supported on the wheel frame and rockable laterally, a plow carried by the main frame and swung laterally by the rocking thereof, and means to raise and lower said plow irrespective of the movement of the wheels and the main frame.

3. In a machine of the character described, the combination of a wheel frame, supporting wheels therefor in permanent axial alinement and adapted to be moved forwardly or rearwardly to raise or lower the frame, means to move said wheels, a main frame pivotally supported on the wheel frame and rockable laterally, a plow carried by the main frame and swung laterally by the rocking thereof, and means to raise and lower said plow irrespective of the movement of the wheels and the main frame.

4. In a machine of the character described, the combination of a wheel frame, supporting wheels therefor in permanent axial alinement and adapted to be moved forwardly or rearwardly to raise or lower the frame, means to move said wheels, a main frame pivotally supported on the wheel frame, means to rock the main frame laterally, a plow carried by the main frame and swung laterally by the rocking thereof, and means to raise and lower said plow irrespective of the forward or rearward movement of the wheels or the rocking of the main frame.

5. In a machine of the character described, the combination of a wheel frame, a rockable axle mounted thereon and having supporting wheels, means to rock said axle to move the wheels forwardly or rearwardly to raise or lower the frame, a main frame pivotally supported on the wheel frame, means to rock the main frame laterally, and a plow carried by the main frame and swung laterally by the rocking thereof.

6. In a machine of the character described, the combination of a wheel frame, and axle supported thereby and having crank ends, wheels mounted on said crank ends in permanent axial alinement, means to rock said axle to raise or lower the frame, a main frame pivotally supported on the wheel frame and rockable laterally, means to rock the main frame, and a plow carried by the main frame and swung laterally by the rocking thereof.

7. In a machine of the character described, the combination of a wheel frame including a transverse tubular member, an axle rockably supported in said tubular member, cranks on the ends of said axle carrying supporting wheels, means to rock said axle to raise or lower the frame, a main frame pivotally supported on the wheel frame, means to rock the main frame laterally, and a plow carried by the main frame and swung laterally by the rocking thereof.

8. In a machine of the character described, the combination of a wheel frame, an arched axle supported thereby and having supporting wheels, means to rock said axle to move the wheels forwardly or rearwardly to raise or lower the frame, a main frame pivotally supported on the wheel frame, means to rock the main frame laterally, a plow carried by the main frame and swung laterally by the rocking thereof, and means to raise and lower said plow irrespective of the forward or rearward movement of the wheels or the rocking of the main frame.

9. In a mechanism of the character described, the combination of a wheel frame, an arched axle supported thereby and having crank ends, wheels mounted on said crank ends in permanent axial alinement, means to rock said axle to raise or lower the frame, a main frame pivotally supported on the wheel frame and rockable laterally, a plow carried by the main frame and swung laterally by the rocking thereof, and means to raise and lower said plow irrespective of the forward or rearward movement of the wheels or the rocking of the main frame.

10. In a machine of the character described, the combination of a wheel frame including a transverse tubular member, an axle supported in said tubular member and rockable therein, cranks on the ends of said axle carrying supporting wheels, means to rock said axle to raise or lower the frame, a main frame pivotally supported on the wheel frame, means to rock the main frame laterally, a plow carried by the main frame and swung laterally by the rocking thereof, and means to raise and lower said plow irrespective of the forward or rearward movement of the wheels or the rocking of the main frame.

11. In a machine of the character described, the combination of a wheel frame including a transverse tubular member, an axle supported in said tubular member and rockable therein, cranks on the ends of said axle carrying supporting wheels in axial alinement, means to rock said axle to raise or lower the frame, a main frame pivotally supported on the wheel frame, means to rock the main frame laterally, a plow carried by the main frame and swung laterally by the rocking thereof, and means to raise and lower said plow irrespective of the forward or rearward movement of the wheels or the rocking of the main frame.

12. In a machine of the character described, the combination of a wheel frame, an axle having crank ends, supporting wheels on said crank ends in permanent axial alinement, means to rock said axle to raise or lower the wheel frame by a forward or rearward movement of the wheels, a main frame pivotally supported on the wheel frame, a support for the rear of the main frame, means to rock the main frame laterally, a plow carried by the main frame and swung laterally by the rocking thereof, and means on the main frame to raise and lower the plow irrespective of the forward or rearward movement of the wheels or the rocking of the main frame.

13. The combination of a wheeled frame comprising a vertically adjustable element, a main frame adjustable vertically with and rockable laterally relatively to the wheel frame, and a plow carried by and vertically adjustable on the main frame and rockably adjustable laterally therewith.

14. The combination of a wheeled frame comprising a vertically adjustable element, a main frame supported on and vertically adjustable with said element, and a plow supported on and vertically adjustable either with the main frame or relatively thereto and rockably adjustable laterally relatively to the wheel frame.

15. The combination of a wheeled frame comprising ground wheels and a crank axle element supported thereon, a main frame pivotally supported on and vertically adjustable with said crank axle element of the wheeled frame, and a plow carried by the main frame and vertically adjustable relatively to both of said frames and rockable laterally relatively to the wheeled frame.

16. The combination of a wheeled frame comprising an element vertically adjustable relatively to the ground, a main frame adjustably connected to said vertically adjustable element, and a plow beam adjustably supported on the main frame and both rockable laterally and adjustable vertically relatively to the wheeled frame.

17. The combination of a plow, a main frame having vertically movable supports for the plow and adapted to be held in fixed predetermined horizontal position, a wheeled frame, connecting devices between the main frame and the wheeled frame for supporting the main frame and adapted to permit the wheels to be positioned at different heights, vertically, relatively to each other and means for locking the wheeled frame to the main frame when the wheels are in either of several differential positions and while the plow is held in horizontal position.

18. The combination of a main frame, a plow carried by said frame and vertically adjustable thereon, a wheeled support comprising two wheels adapted to travel operatively on different horizontal lines and a transversely positioned frame element carrying said wheels, and connecting devices interposed between the main frame and the wheeled frame, said connecting devices providing a transverse vertically adjustable axis and a longitudinal horizontal axis around both of which axes the plow can be adjusted relatively to the wheels.

19. The combination of a main frame, a viding a transverse vertically adjustable on the said frame, two ground wheels, a transversely positioned frame supported on said wheels, and connecting devices interposed between the transverse wheel-supported frame and the main frame and comprising two hinge devices which provide a universal joint between the plow and the wheeled frame, the two axes of the hinges lying in a common plane.

20. The combination of a plow, a main frame, a transversely extended wheeled frame, devices connecting the wheeled frame to the main frame, means for vertically adjusting the plow in the main frame, means for rocking vertically the transverse wheeled frame while the plow remains stationary vertically, and means for locking the main frame to the wheeled frame after a rocking adjustment has been made.

CARL G. STRANDLUND.

Certificate of Correction.

It is hereby certified that in Letters Patent No. 1,476,736, granted December 11, 1923, upon the application of Carl G. Strandlund, of Moline, Illinois, for an improvement in "Lister Plows," an error appears in the printed specification requiring correction as follows: Page 3, line 123, claim 19, strike out the syllable and words " viding a transverse " and insert instead *plow carried by and;* and that the said Letters Patent should be read with this correction therein that the same may conform to the record of the case in the Patent Office.

Signed and sealed this 17th day of February, A. D. 1925.

[SEAL.] KARL FENNING,
*Acting Commissioner of Patents.*